United States Patent [19]

Gravert

[11] 4,123,753
[45] Oct. 31, 1978

[54] ULLAGE MEASURING DEVICE

[75] Inventor: William H. Gravert, Port Washington, N.Y.

[73] Assignee: Marine Moisture Control Company, Inc., Inwood, N.Y.

[21] Appl. No.: 727,894

[22] Filed: Sep. 29, 1976

[51] Int. Cl.$^2$ .................. G08B 21/00; G01B 3/10; B65H 75/30

[52] U.S. Cl. .................. 340/621; 33/126.5; 174/112; 174/115; 174/117 F; 242/84.8; 242/100; 361/212

[58] Field of Search ............... 340/244, 247; 33/126.5, 33/138; 242/84.8, 96, 99, 100, 100.1, 106, 107; 174/112, 115, 117 F, 117 FF; 361/212, 214, 215

[56] References Cited

U.S. PATENT DOCUMENTS

| 871,124 | 11/1907 | Knoblock | 340/247 |
|---|---|---|---|
| 896,765 | 8/1908 | Sears | 242/100 |
| 1,123,642 | 1/1915 | Wright | 242/99 |
| 1,443,357 | 1/1923 | Gardner | 340/247 |
| 1,497,178 | 6/1924 | Lorenz | 33/126.5 |
| 1,498,960 | 6/1924 | Gardner | 340/247 |
| 2,172,907 | 9/1939 | Humphrey | 242/100 |
| 2,997,878 | 8/1961 | Graham | 33/126.5 X |
| 3,311,983 | 4/1967 | Green | 33/126.5 |
| 3,944,994 | 3/1976 | Fanshawe | 340/244 R |

FOREIGN PATENT DOCUMENTS

| 502,301 | 3/1939 | United Kingdom | 340/247 |

*Primary Examiner*—John W. Caldwell, Sr.
*Assistant Examiner*—Daniel Myer
*Attorney, Agent, or Firm*—J. Harold Nissen

[57] ABSTRACT

An ullage measuring device and an accurate method of using an ullage tape to find the surface of a liquid in a tank without visual sighting. The ullage device includes a composite tape formed of a tape from which readings of ullage may be obtained and electrical conductors to activate circuitry for rendering a crystal operative to transmit sonic energy to another crystal adapted to receive sonic energy and to activate one of the conductors to provide an audible indication at a point remote from the surface of the liquid when the effective end of the composite tape has reached the surface of the liquid.

20 Claims, 11 Drawing Figures

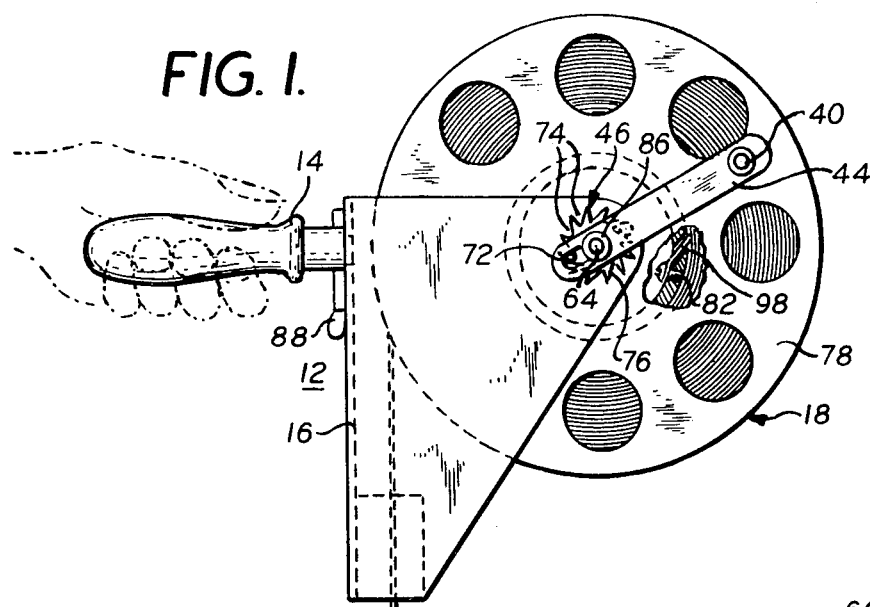
FIG. 1.
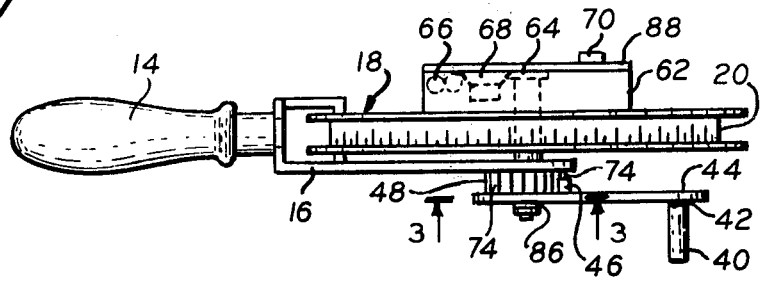
FIG. 2.
FIG. 3.
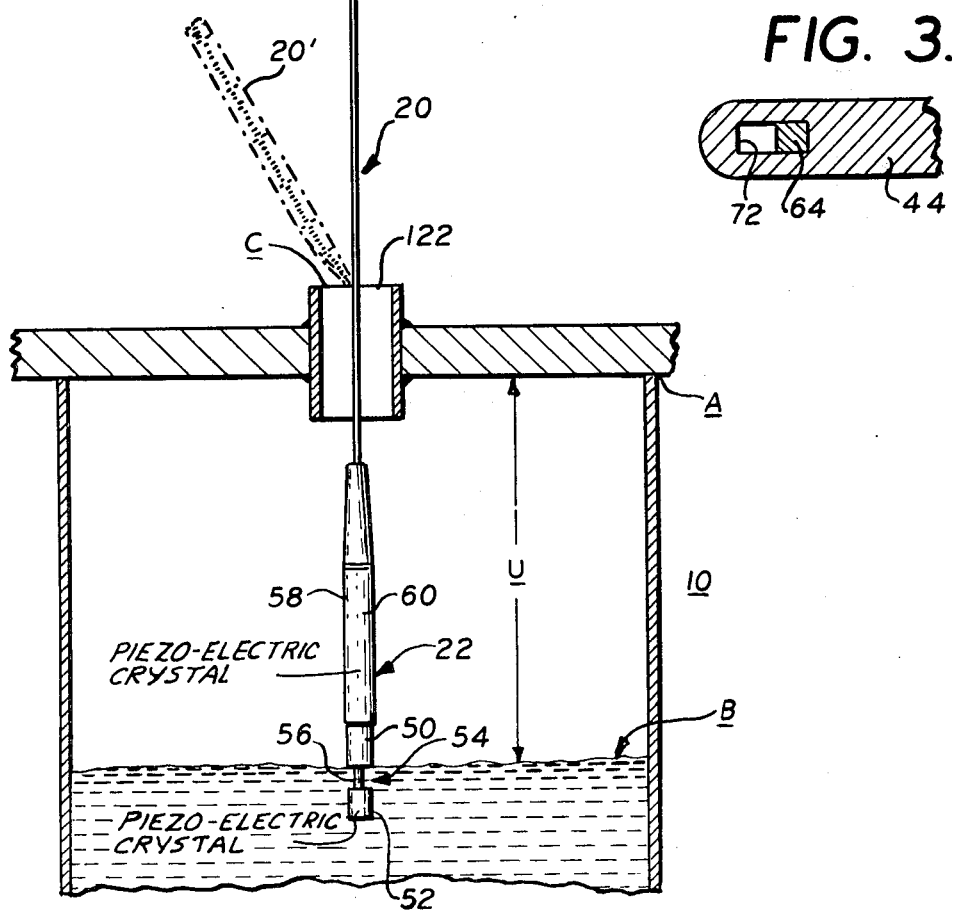

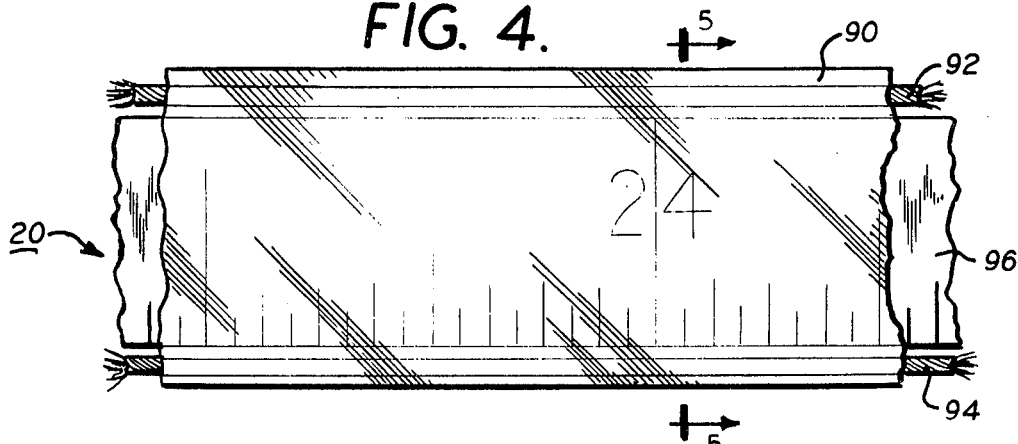
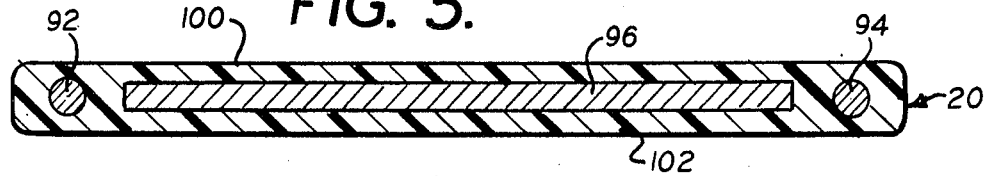
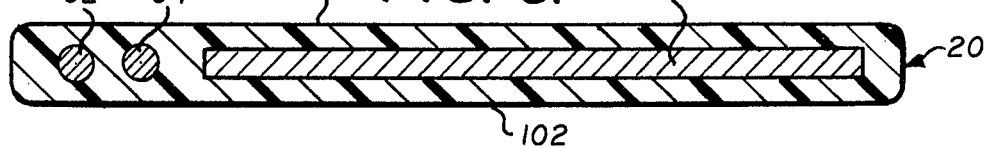
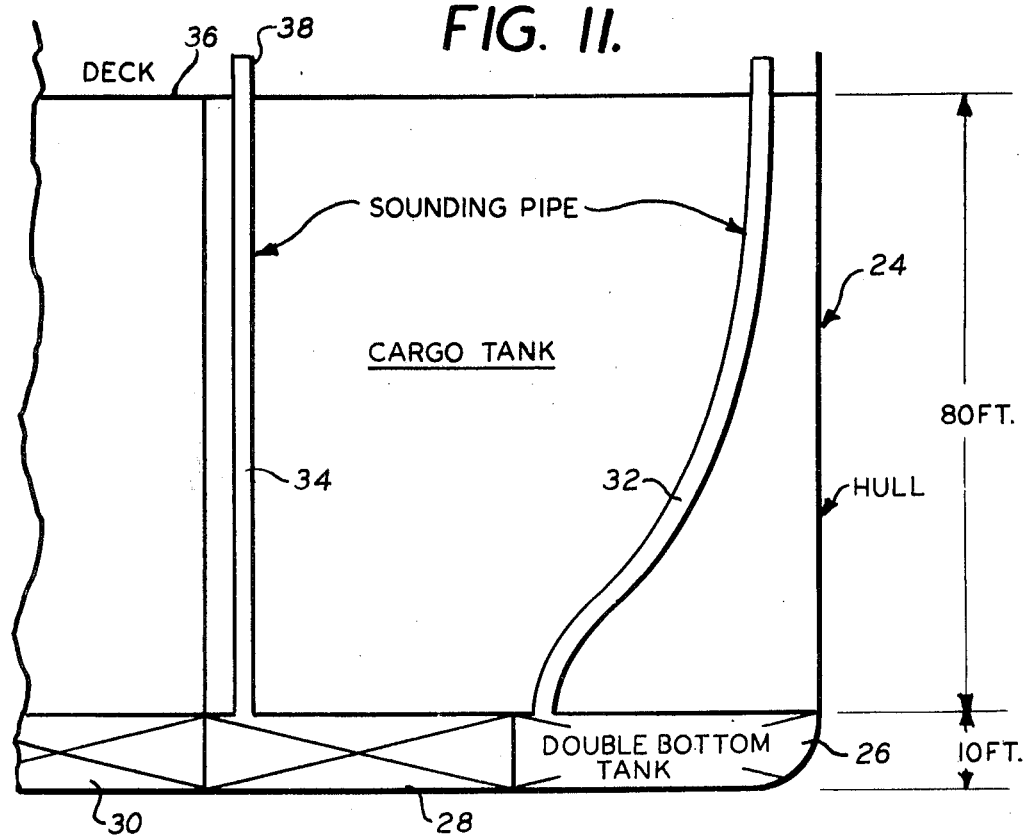

ULLAGE MEASURING DEVICE

This invention relates to an ullage measuring device.

The term "ullage" is used to specify the measurement between the top of a cargo tank and the surface of a liquid in the tank. Specifically, the term "ullage" designates the amount of fluid which is missing from a tank in order to fill the tank completely.

More specifically, the invention is concerned with a device for measuring the ullage of tanks, which contain petroleum or other hazardous fluid substances in the liquid state, e.g., storage tanks of oil cargo vessel ships or other fluid transporting vessels. The ullage device may be portable and hand carried and/or motorized.

Heretofore, in order to measure ullage, a coated tape measure with a bob at the end was lowered to the surface of the liquid and the difference between the top of the tank and the surface of the liquid was read on the tape. If volume is desired, tables were provided to convert the vertical measurement to its volumetric measurement using a specific calibration table for a specific tank. Ullage measurement is a necessity in the handling of liquid products, both aboard a tank ship and shoreside. The large size of today's tanks, plus the expensive costs of the liquids, demand accuracy never before required for custody transfer and inventory purposes. A ⅛ inch error in a large tank can cost thousands of dollars. Remote and automatic tank gauging systems cannot be used as they all contain error. In fact, they are brought into "best" calibration using the portable ullage device and tape according to the invention. The accuracy of this process depends on establishing with accuracy the top of the tank and the surface of the liquid below the top of the tank. The top of the tank is not difficult to locate, but the surface of the liquid is.

A few unsatisfactory methods have been used heretofore to ascertain the surface of the liquid. One such method is the visual sighting through a small opening in the tank hatch. In general, it is quite difficult to see the bob at the end of the tape as the bob could be 80 feet below the opening and be in the dark in the tank. Moreover, the user or operator of the tape, or the "gauger" as they are called, is exposed to vapors or noxious fumes in the tank. Another method which has been used is to coat the end of the tape with chalk over a six foot length. The tape is then lowered into the tank below the liquid surface and then the tape is withdrawn. After the tape is withdrawn, the wet length on the tape is subtracted from the tape length noted at the top of the opening. This would be the process to measure one tank. As is well-known, an oil tanker has a minimum of twenty tanks, and one can readily appreciate that this is a dirty, time consuming and error-prone problem, particularly on a crude oil tanker. Another method is the use of a conductivity cell attached to the end of a tape. This method cannot be used with liquids that are non-conductive.

At present, there is a new trend on ships to operate the vessel with all the cargo tanks filled with inert gas as a protection against explosion. This means that all the tanks are sealed tight and pressurized to one-half pound per square inch. The gauging of a tank in this condition is impossible with the existing gauging tapes. The instant an ullage hatch is opened, the flow of inert gas from the inside of the tank to the atmosphere at a very high velocity can endanger the individual or gauger taking the measurement. This high flow rate can continue for fifteen minutes and perhaps indefinitely, if the inert gas system furnishing gas to the tanks is in operation. Accordingly, for the transfer of cargo from one owner to another, the only accepted method useful for determining exact quantities is to hand-gauge the tanks.

The opening of the ullage hatch is usually about six inches in diameter, and if the gauger uses the prior art gauging devices, he must stand over the ullage hatch. This is fraught with danger due to the possibility of the gaseous fumes hitting his face, thereby causing a loss of oxygen and asphyxia.

In accordance with the invention, a portable ullage measuring device is provided for the measurement of a fluid medium in its non-gaseous state while affording protection to the gauger and avoiding the deleterious effects of the noxious fumes emanating from the ullage hatch, and includes a fluid responsive device for producing an output signal when it is placed in contact with the fluid medium, a tape reel mechanism adapted to support a tape reel assembly which includes measuring indicia to measure the ullage of a tank above and away from the ullage hatch while supporting the fluid responsive device inside the tank to take the ullage measurement, an alarm indication mechanism associated with the tape reel mechanism to produce an alarm or other indication in response to an output signal from the fluid response device, and means is coupled with the tape reel mechanism to control the amount of payout of the tape assembly and to stop the payout thereof when the fluid responsive device makes contact with the fluid medium.

A further feature of the invention is the use of a composite tape assembly which includes a pair of electrically conductive wires and a metallic tape which is used as an internal ground for the device and which is provided with marking or measuring indicia thereon, all enclosed within a clear inert fluid impervious material. The tape reel mechanism is adapted to be hand-held and includes a battery to energize the fluid responsive device; the alarm which is preferably audible, but which may be any other indicating mechanism is also housed within the tape reel mechanism, together with a switch which is provided to shut off the alarm after the fluid responsive device makes contact with the liquid, a visual reading may be made of the tape after the payout of tape is stopped.

With the present invention, it is not necessary for the gauger to look directly into the ullage hatch opening, and he can thereby avoid any injury as a result of gas spewing up into his face or to become asphyxiated as a result of the noxious fumes from a product such as an oil or petroleum product. Hence, an important aspect of this invention is the ability to ascertain and to determine where the surface of a liquid is without visual sighting or inspection.

An ultrasonic probe of the type which may be used as part of the fluid sensing means in the invention and may form part of the bob is disclosed in U.S. Pat. No. 3,420,186. This patent discloses the use of a pair of piezo-electric transducer crystals adapted to be fixed to the opposite sides of a container. When the liquid or fluid passes through the air space between the two piezo-electric crystals, one of which is the transmitting transducer and is adapted to transmit ultrasonic energy which is picked up by the other receiving transducer. This patent also discloses a suspension of the spaced transducers in a fluid or a liquid, but there is no indication that it can be used for the measurement of ullage, or that a tape mechanism can be used in conjunction with the same to transmit electrical energy to the transducers and to return a signal from the transducers.

The tape assembly includes a plastic coated measuring metallic tape which together with a pair of conductors is enclosed within a clear plastic jacket such as a "Teflon" jacket. In addition, a pair of electrically conductive wires may also be enclosed within the Teflon jacket but insulated from the metallic tape, which serves as an internal ground, so as to provide the suitable connection between the electronic components in the bob and the energization means and the alarm indication device on the tape reel mechanism.

The present invention also contemplates the use of a tape assembly or construction which has an outer protective covering of insulating material which is knurled or dimpled so as to provide for an irregular surface cover for a metallic tape. The tape construction with an irregular covering surface is especially useful in those situations where there is a large static charge build up. The novel and improved tape construction helps to reduce the static charge build up because the charge leaks through and is dissipated by the metallic tape inside the dimpled insulating surface protection cover.

It is therefore an object of the present invention to provide a portable ullage measuring device which can be used to ascertain the amount the fluid level is below the top of a container and to obtain such readings directly while not looking directly into the ullage hatch opening.

A further object of the invention is to provide a portable ullage device which is free of shock hazards.

Another object of this invention is to provide a portable ullage measuring device which can be used to measure the fluid level in a tank which is partially filled with an inert gas and a volatile substance.

Yet another object of the invention is the provision of a portable ullage measuring device which is essentially free of electrical charge build-up.

With the present invention, it is possible for an individual to obtain an accurate measurement of ullage while being afforded protection from gas fumes or other noxious substances and not having to be concerned with the build-up of static charge.

Other objects and advantages of the invention will be obvious to those skilled in the art from the following specification and claims which include a preferred embodiment of the present invention and from the drawings which are herein made a part of the specification, wherein:

FIG. 1 illustrates the portable hand-held ullage device with the bob thereof in the fluid of a tank in which the ullage thereof is to be measured;

FIG. 2 is a plan view looking down from the top of FIG. 1;

FIG. 3 is a section taken on line 3—3 of FIG. 2;

FIG. 4 is a view of one embodiment of a tape assembly for use with the portable hand-held ullage device;

FIG. 5 is a section taken on line 5—5 of FIG. 4;

FIG. 6 is a sectional view similar to FIG. 5, but showing a modification of the tape assembly of FIG. 4;

FIG. 11 is a schematic representation of a cargo tanker of the type with a double bottom and illustrating "sounding" pipes through which cargo content readings may be taken with the hand-held ullage device according to the invention.

Figure 7:
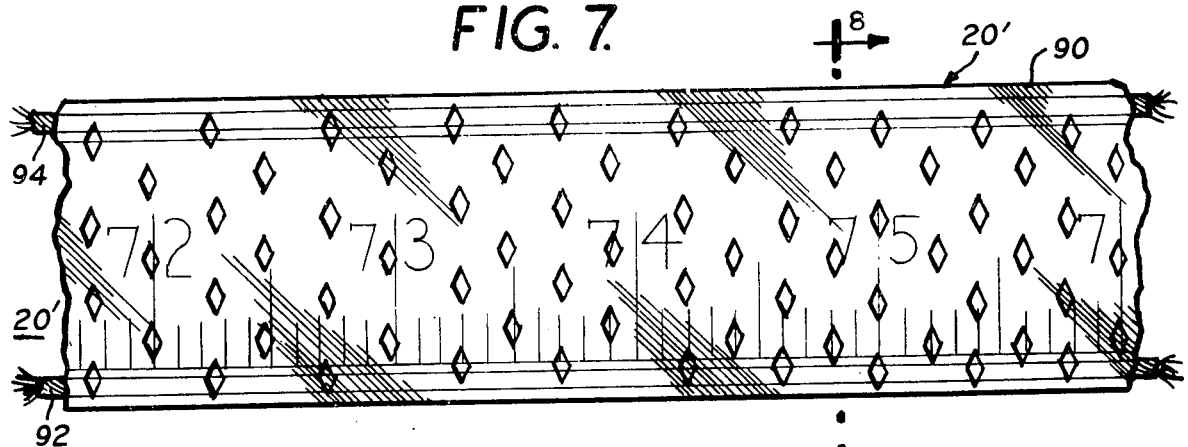
FIG. 7 is a view of another modification of the tape assembly according to the invention.

Referring to the drawings, which illustrate the preferred embodiments of this invention, a tank 10 having a ullage to be measured is shown with the top of the tank at A and a liquid level, to be measured, at point B. The ullage U is the difference between the points A and B, and it is this difference which is to be measured in order to ascertain the quantity of liquid or fluid which is missing from the tank 10. The portable ullage measuring device 12, which may be hand-held, includes a handle 14 connected with housing 16 for supporting a tape reel mechanism 18. The handle 14 is held in one hand (shown in phantom) by the "gauger" to support the ullage device 12. The tape reel mechanism 18 carries the tape assembly 20, which supports and carries a fluid responsive device 22.

The tank 10 may be any type of tank containing a liquid whose quantity is to be measured. And, more specifically, tank 10 may also be the type which is part of a cargo tanker for the transport of oil or other fluid or liquid commodity. The tank 10 may also be of the type shown in FIG. 10 and form part of a cargo tanker 24 provided with a double bottom tank having separate compartments 26, 28 and 30 at a lower level of the tanker. While only three compartments have been shown, it is evident that the cargo tanker 24 may suitably contain many separate compartments such as 26, 28 and 30. In order to take a reading of the quantity of liquid material in each compartment, a "sounding" pipe, such as 32 which goes to compartment 26, and 34 which goes to compartment 28 is shown. It is to be understood that each compartment is provided with its own individual "sounding" pipe through which an ullage reading is to be taken, even though no "sounding" pipe is shown for compartment 30.

As will be explained further hereinafter, the reading is taken by a "gauger" who stands on the deck 36 with the handheld ullage device 12 (not shown in FIG. 11) and takes the reading. The edge 38 at the opening of the "sounding" pipe provides the reference point at which the reading is taken.

Referring now more particularly to FIG. 2, in order to control the amount of playout of the tape assembly 20, means are provided which include another handle 40 rotatably coupled at 42 to a slide crank 44 for rotating tape reel mechanism 18, which is carrying tape assembly 20. The slide crank 44 includes a stop pin 46 adapted to engage a reel indexing mechanism 48.

The fluid responsive device 22 includes a sonic energy transmitting crystal 50 and a sonic energy receiving crystal 52 positioned within a casing 54 which is provided with an air gap 56. Coupled to the crystal casing 54 is a casing 58 to hold the electronic circuitry, shown in FIG. 11, generally designated as 60, which includes the means to energize the transmitting crystal 50 with sonic energy which is adapted to be transmitted past the air gap 56 only through a fluid medium and to be received by the receiving crystal 52. The electronic circuitry 60 also includes detection means and amplification means to detect the signal received from the receiving crystal 52 as will be explained further in connection with FIG. 11. The mechanism 18 includes a hub 62 which is carried on a shaft 64 and forms a housing which includes compartments in order to contain provisions for batteries 66, a horn alarm 68, and the electrical components for an on-off switch 70 which includes its toggle or pushbutton outside the compartment and the electrical connection elements inside the compartment.

The slide crank 44 includes a transverse slot 72 so as to permit the slide crank 44 to slide along shaft 64 to engage the stop pin or lug 46 with one of the openings or slots 74 provided on the periphery of the toothed sprocket device 76 of the tape reel mechanism 18 to lock the tape reel mechanism 18 against rotation. The tape reel mechanism 18 includes a reel 78 onto which tape assembly 20 may be wound or unwound and locked against payout by means of stop pin 46 and one of the stop slots 74.

The tape reel mechanism 18 includes the hub 62 which carries reel 78 and includes a grounding screw 82 to ground tape assembly 20 to the housing, and if desired, an external ground clip 88 with an extension coil from grounding screw 82 may be provided to ground ullage device 12 to cargo tanker 24. A washer or guide 86 is provided to guide and to control the movement of slide crank 44 on shaft 64. The shaft 64 is shown as having a square cross-section to permit slide crank 44 to slide along the shaft 64 and together with the washer 86 to guide the movement of the crank 44.

The tape assembly 20 includes a plastic jacket 90 which is impervious to the liquid in the tank 10 or compartments 26, 28, 30 and which encloses conductors 92 and 94 as well as a metallic tape 96 having measuring indicia thereon. The conductors 92 and 94 are shown as positioned on opposite sides of the tape 96 in FIG. 5 and next to each other in FIG. 6.

The plastic jacket 90 is made to be impervious to the liquid under measurement, and preferably is oil impervious when the tape assembly is used to measure oil ullage. The metallic tape 96 has one end 98 connected with grounding screw 82, and the tape forms the ground connection for the electrical circuit connecting conductors 92, 94 with the electronic circuitry 60.

In the FIGS. 4 to 6 embodiments of the tape assembly 20, outer surfaces 100, 102 are shown generally flat and smooth with a uniform cross-section transverse to the longitudinal direction or run of the metallic tape 96. This configuration is generally satisfactory for most contemplated uses of the ullage device.

Figure 8:
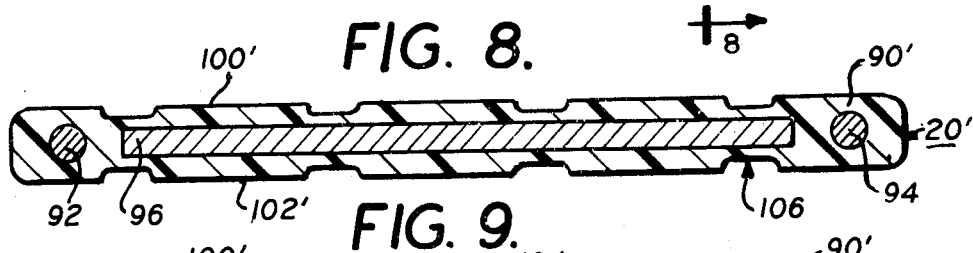
FIG. 8 is a section taken along line 8—8 of FIG. 7.
Figure 9:
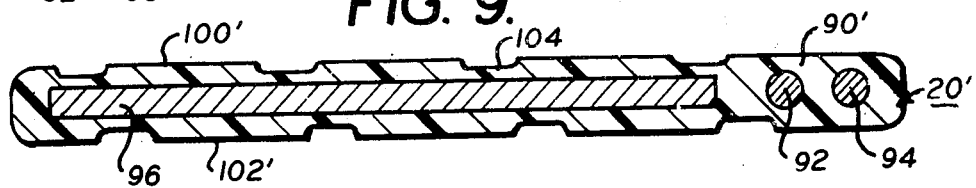
FIG. 9 is a sectional view of another modification of the tape assembly of FIG. 7.

In some instance, electrical charge may build up along the outer surfaces of the tape assembly 20, and in order to avoid such charge build-up and to remove the same, a modified tape assembly 20' (as shown in FIGS. 7 to 9) is provided in which the outer surfaces 100' and 102' are dimpled or knurled as at 104 to provide a narrower cross-section of the jacket 90'. The narrowed longitudinal cross-section as shown at 106 permits the charge to leak through the "Teflon" coating or jacket 90' to the metallic tape and is dissipated thereby. When the device 12 is connected to an external ground, such ground assists in the dissipation of the electrical charge.

The embodiments of tape assembly 20' shown in FIGS. 7 and 8 are generally similar to the FIGS. 4 and 5 embodiment with conductors 92 and 94 positioned on opposite sides of metallic tape 96, and the FIG. 9 embodiment is generally similar to the FIG. 5 embodiment, except that the outer jacket 90' is periodically undercut to provide the dimpling or knurling effect. While not specifically shown, it will be evident that it is possible to achieve almost the same results of eliminating electrical charge build-up by dimpling or knurling only one surface 100 or 102 of the outer jacket 90.

The embodiments of FIGS. 4, 5 and 7, 8 with conductors 92, 94 positioned on opposite sides of the metallic tape 96 may be more advantageous where capacitative effect occurs as a result of the placement of the conductors 92, 94 on the same side of the tape 96. In some instances, where conductors 92 and 94 are placed on opposite sides of the tape 96, the center portion of the jacket 90 between the conductors may also be made of reduced crosssection, but uniform throughout. This will also serve to assist in the prevention of charge build-up by leaking the charge through the jacket to the tape for dissipation thereby. Moreover, the positioning of the conductors 92, 94 on opposite sides of the tape 96 aids in the maintenance of the tape assembly by imparting some rigidity thereto while maintaining the necessary flexibility to coil the tape assembly onto the reel 78. The conductors 92, 94 and the tape 96 form a composite unit. It is within the scope of the invention to use a fibreglass or fabric tape. If such a tape is used, then, of course, it will be necessary to provide for a third or grounding wire.

The circuitry 60 associated with the piezo-electric transmitting and receiving crystal 50 and 52 is depicted in its preferred form in FIG. 11, wherein the transmitting amplifier section 110 as exemplified by the circuitry connected with the transistor amplifier 112 by means of one of the conductive wires 92 to switch 70 and battery 66, the common ground being supplied by tape 96, which is connected to ground. The battery 66 which consists of preferably two "AA" cells to provide three volts D.C. is applied across transistor amplifier 112 to energize the piezo-electric transmitting crystal 50 for the transmission of sonic energy. The transmitting amplifier section is only rendered operative when the switch 70 is closed to energize the crystal 50 to cause it to oscillate and to transmit sonic energy.

The piezo-electric crystal 52 is connected in circuit with a detector section 114 which includes transistor 116. The detector section 114 is only rendered operative to receive a signal from crystal 52 when the switch 70 is closed to connect the transistor 116 also with a minus three volts D.C. The crystal 52 is rendered operative to cause the detector section 114 to transmit a signal when the air gap 56 between the crystals 50 and 52 is filled with a liquid for the transmission of sonic energy. The amplifier section 118 includes a transistor amplifier 120 which is coupled to the output of detector section 114 for amplifying the signal detected by the transistor 116 and applying it to the horn 68 through conductor 94. The horn 68 is connected across conductors 92 and 94 and is rendered operative solely when there is a signal transmitted through the conductor 94 or when the conductor 94 has a voltage which is positive with respect to the three volts D.C. on conductor 92. The horn 68 suitably transmits a 3500 Hz signal. The transistors used in the circuit 60 are preferably high voltage transistors for safety purposes with the resistors used being $\frac{1}{4}$ watt ±5% and designed to withstand 500 VAC insulation test.

While a preferred circuit has been shown, other circuits may also be used provided that conductors 92 and 94 electrically connect the transmit and the receive signals so as to energize the circuits to provide the energy for the transmit crystal 50 to transmit sonic energy to the receive crystal 52 and in turn for the electronic circuitry 60 to detect the sonic signal received by the receive crystal 52 and to amplify the same for transmission to the horn alarm 68 to activate the same. The tape 96 and conductors 92 and 94 are electrically connected to the appropriate elements inside the housing or hub 62.

The tape assembly 20 and the fluid responsive device 22 connected at the payout end thereof can be raised or lowered by means of the hand crank 44.

When the switch 70 is closed, energy is fed from the batteries 66 located in the hub to the electronic circuit 60, which is located in the casing or tape bob 58. Energizing the circuit 60 causes the transmit crystal 50 to vibrate at its natural frequency, thereby sending a sonic signal through the air gap 56 when it is filled with the liquid being measured to the receiving crystal 52.

Only when the air gap 56 is immersed in liquid does a sonic transmission between the crystals 50 and 52 take place, thus causing the horn alarm 68 to sound. When the gap 56 between the crystals is filled with air, there is very poor sonic transmission, as a result of which the horn alarm 68 does not operate or sound. The tape assembly 20 and the fluid responsive device 22 as a unit is lowered into a tank until the horn alarm 68 is sounded at which time it is lifted slightly until the horn is silent. As a result of this motion, the surface level of the liquid is established, and this is at point B (as shown in FIG. 1). Now, it remains unnecessary to read the ullage on the tape which provides a direct indication of the amount of liquid missing between point B and point A.

Figure 10:
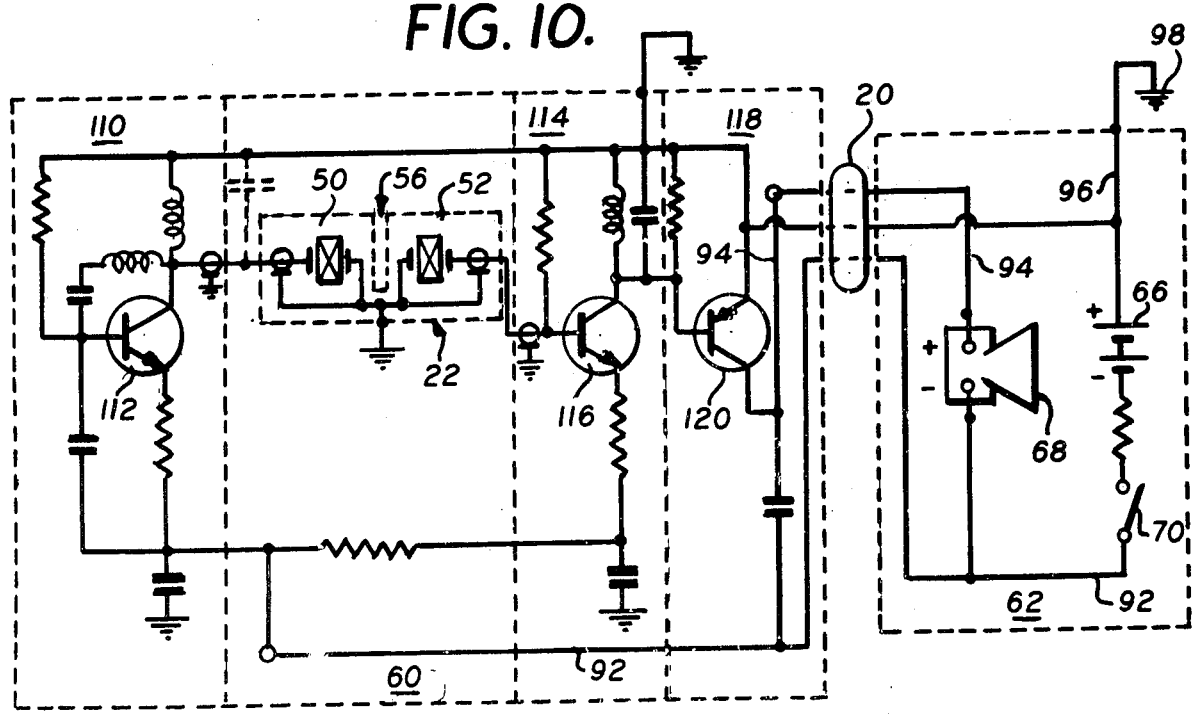
FIG. 10 is a schematic representation of the circuit elements and electrical components of the ullage device.

The tape 20' is shown in dotted outline in FIG. 1 to demonstrate that it is not necessary for the gauger to look into the tank in order to ascertain the reading to be taken. The tape may be directly calibrated in accordance with the tank capacity of the vessel so that direct readings may be obtained at point C with the guager not standig directly over the opening 122 (as shown in FIG. 1) or at the edge of the opening 38 (as shown in FIG. 10). When the tape is not directly calibrated, the appropriate volume may be obtained by using the tank's calibration table.

The sonic sensor head assembly or fluid responsive device 22 is immersed in fluid such that the upper face of the portion cotaining crystal 50 is wetted, and then when circuitry 60 is energized, a sonic signal originated by the sensor head circuits freely crosses the probe gap 56 and is detected and amplified for energizing the horn 68, thereby causing a high pitched audible signal to be heard. When the sonic probe is in air, the sonic signal cannot cross the probe gap 56, due to attenuation, and therefore the horn is silent.

A hub cover 88 is provided for enclosing the hub 62, which carries the external portion of the switch 70, and for enclosing the batteries 66 and the sonic horn 68. Means to provide for the exit of sound is provided. The stop slots 74 are peripherally spaced so that the tape reel can be locked in a number of different positions to facilitate the taking of the reading.

The metallic tape may be provided with readings to measure lengths in feet, in meters or in liters, and it is possible to use a tape having liters thereon which are related to the volume of oil or other liquid under measurement, so that direct readings can be obtained from the tape in order to measure the ullage. It is possible to construct a tape marked in volume - Bbls. for a specific tank. The tape could then only be used with that specific tank.

It has been found preferable to use zinc-carbon or alkaline type batteries so that with normal usage, replacement should not be required for at least six months.

The reel slide crank 44 is utilized by the operator to raise or to lower the probe which is attached to the tape.

The teeth 74 on sprocket 76 cooperate with the stop pin 46 to prevent the reel 78 from rotating, and the crank 44 effectively locks the reel 78 to prevent payout of the tape assembly. The shaft 64, which is square instead of being round, permits the crank 44 to be guided by slot 72 which acts as a guideway.

In operation, the sensor head is slowly lowered into the tank until a high pitch sound is heard, the measurement is confirmed by raising up the head until the sound ceases.

It has been found that the device will operate successfully in the following liquids:

| Fresh Water | Butyl Acetate | Methol Acetate (6-C-A) |
|---|---|---|
| Salt Water | Ethyl Acetate | Methol Acetate (1-6-F) |
| Lube Oil | Vinyl Acetate | Santicizor #711 |
| Kerosene | Amoco Styrene | Santicizor #160 |
| Crude Oil | Pentane | Methol Ethyl Ketone |
| Gasoline | Jet A | Heavy Paraffin (4-P-SP+41 -5S) |
| Diesel | Tallow | |
| Xylene | No. 6 API 25 | |

The advantages of the portable hand-held ullage device are that it requires no external power source and weighs only five· or six pounds. It is driven by two "AA" penlight batteries with a minimum battery drain and will operate for a minimum of 500 hours. Accuracy can be obtained to 1/32 of an inch or better, or 0.7 millimeters or better, and no correction for temperature or specific gravity of the fluid being measured is needed. Moreover, no knowledge of the approximate level in the vessel beforehand is needed. The signal which is used to energize the transmitting piezo-electric crystal transducer is preferably a one MHz signal.

The high intensity audible signal overcomes background noise and allows operation in bright sunlight as well as nighttime and permits accurate gauging in wet weather.

Moreover, it is possible to measure tanks under inert gas pressure without exposing operators to fumes. In this respect, the ullage can be taken through a 1½ inch gate valve to reduce the escape of vapors to the atmosphere.

While the ullage device is shown as including a handle 14, such handle 14 may be omitted and the ullage device may be carried by a support or supported on the deck of a cargo tanker in proximity to the tank 10 and be non-portable. It is also possible to make the ullage device with heavier components so that it is not readily portable. However, the fact that the ullage device is either portable or non-portable does not change its characteristics or mode of operation. Because of the unique association of the various elements, it is possible to have the added feature of a portable ullage device without in any way detracting from the unique results obtained with its use as an ullage measuring device.

While the ullage device has been shown in its preferred form as portable and not motorized, it is possible to motorize the ullage device. Such motorization of the ullage device in its preferred form is best applied to the ullage device in its nonportable form so as not to add weight to the portable ullage device and detract from its portability. Nevertheless, it is possible to motorize the portable ullage device and thereby eliminate the handle 40 and slide crank 44. Moreover, while it is possible to eliminate the handle 40 and the slide crank 44, some manual means to control the amount of playout of the tape assembly 20 should be provided so that the manual means can act as an override on the motorized means, should this be desired.

While there has been shown what is considered to be the preferred embodiments of the invention, it is obvious that various changes and modifications may be made therein without departing from the spirit and scope of the invention.

What is claimed is:

1. An ullage measuring device for the measurement of fluid in a storage tank without visual sighting while affording protection from gas fumes or other noxious substances, comprising:

a fluid responsive device for producing an output signal when in contact with a fluid medium comprising a sonic energy transmitting device, sonic energy receiving device, and a housing enclosing said sonic energy devices in spaced relationship relative to each other to provide a free space therebetween to permit the application of different mediums between said transmitting and receiving devices for the transmission of sonic energy depending upon the medium, interposed in said free space, from said transmitting device to said receiving device;

a tape reel mechanism comprising a tape assembly having measuring indicia thereon, said tape assembly having one end coupled with said fluid responsive device and another end coupled with said tape reel mechanism;

an alarm indication mechanism associated with said tape reel mechanism responsive to said output signal which is generated in response to the fluid filling said free space for producing an alarm indication; and, means coupled with said tape reel mechanism to control the amount of payout of said tape assembly for stopping the payout thereof when said fluid responsive device makes contact with said fluid medium.

2. The ullage device as recited in claim 1, comprising:

energization means carried by said tape reel mechanism; and, switch means carried by said tape reel mechanism coupling said energization means with said alarm indication mechanism for rendering said alarm indication mechanism operative in response to said output signal from said fluid responsive device and adapted for decoupling said energization means from said alarm indication mechanism after being rendered operative in response to said output signal, whereby to render said alarm indication mechanism inoperative.

3. The ullage device as recited in claim 1, said tape reel mechanism comprising:

a tape reel including a tape assembly receiving and attachment means therefor;

a shaft fixed to said reel;

a slide crank slidably coupled with said shaft for rotating said reel to wind or to unwind said tape assembly; and, said control means comprising:

a reel locking mechanism coupled to said shaft, said locking mechanism including a toothed ratchet mechanism, said crank including an elongated slot for coupling thereof to said shaft but permitting slidable transverse movement axially of said shaft, a lug carried by said crank engageable with said toothed mechanism to lock said reel against rotation, said crank being movable to move said lug out of engagement with said ratchet, the movement of said crank being guided by said slot, said crank being effective to rotate said shaft when said lug is disengaged from toothed mechanism and being effective to cause said lug to engage said ratchet whereby to lock said reel against rotation, thereby preventing payout of said tape assembly.

4. An ullage device as recited in claim 1, said tape reel mechanism comprising:

a housing for supporting said tape assembly;

a carrying handle connected with said housing for hand-carrying and holding thereof;

a drive shaft rotatably coupled with said carrying handle;

a hub fixed for rotation on said shaft, said hub including a plurality of compartments, a hub cover enclosing said compartments, said tape assembly being fixed to said hub for rotation therewith;

said alarm indication mechanism including a horn alarm contained within one of said compartments;

an energization means including batteries contained in another of said compartments, a power switch operable externally of said cover including parts contained in another of said compartments, and a pair of electrical wires coupled with said fluid responsive device electrically connected with said batteries and said horn alarm internally of said hub; and, a tape assembly connection internally of said hub for connecting and holding said tape assembly onto said reel, said coupling means including:

a reel index mechanism fixed to said housing, said index mechanism having a plurality of peripherally spaced stop openings; and, a slide crank including a stop pin engageable with one of said stop openings to lock said crank with said housing, said slide crank including a longitudinal slot for coupling said crank with said shaft for rotation thereof, said crank being movable transversely of said shaft but prevented from disengagement therewith from a first position in which said stop pin engages one of said stop openings to a second position in which said stop pin is disengaged from said stop openings whereby to permit rotation of said shaft.

5. An ullage device as recited in claim 4, said tape assembly including:

a pair of electrical conductors coupling said fluid responsive device with said alarm indication mechanism;

a metallic tape having said measuring indicia thereon; and, a clear plastic insulated jacket enclosing said pair of electrical conductors and said metallic tape, said insulating material being impervious to oil and adapted for the prevention of static charge build-up, said pair of electrical wires forming a composite unit with said metallic tape, but insulated therefrom.

6. An ullage device as recited in claim 1, said tape assembly including:

a pair of electrical conductors coupling said fluid responsive device with said alarm indication mechanism;

a metallic tape having said measuring indicia thereon; and, a clear plastic insulated jacket enclosing said pair of electrical conductors and said metallic tape, said insulating material being impervious to oil and adapted for the prevention of static charge build-up, said pair of electrical wires forming a composite unit with said metallic tape, but insulated therefrom.

7. An ullage device as recited in claim 6, said fluid responsive device including:
electrical circuitry and signal detection and amplification means connected with said devices, one of said conductors being connected with said energization means for energization of said electrical circuitry and said sonic transmitting device, the other of said electrical conductors being connected with said sonic energy receiving device through said signal detection and amplification means for transmitting a signal detected from said receiving device to energize said horn alarm, when a sonic signal transmitted from said transmitting device is received by said receiving device, said receiving device receiving said signal from said transmitting device when the fluid under measurement fills said free space.

8. An ullage device as recited in claim 7, wherein:
said electrical conductors are positioned on opposite sides of said tape in said jacket,
said metallic tape forms an internal ground for said electrical circuitry, and
one of said conductors being connected with the inputs to said transmitting and to said receiving devices and with said batteries through said power switch, whereby closing of said power switch renders said transmitting device operative to transmit a sonic signal and said receiving device operative to receive said transmitted sonic signal.

9. The ullage device as set forth in claim 1, wherein:
said tape assembly includes a pair of electrical conductors coupling said fluid responsive device with said alarm indication mechanism, a tape proviced with said measuring indicia thereon, and a clear inert fluid impervious material enclosing said electrical conductors and said tape, said tape enclosure being knurled to eliminate electrical charge build-up; and,
including switch means and energization means, one of said conductors being connected in circuit with said switch means and said energization means to render said fluid responsive device operative, said switch means being coupled with said tape reel mechanism and including an externally operative switch, the other of said conductors being coupled in circuit with said alarm indication device and said fluid responsive device for rendering said indication device operative to produce an audible sound in response to said fluid responsive device making contact with the fluid medium, and said tape being in circuit with said conductors and forming an internal ground for said device.

10. The ullage device as recited in claim 1, including:
electronic circuitry coupled with said fluid responsive device and said alarm indication mechanism through said tape assembly; said electronic circuitry comprising:
an amplifier section having its output coupled to said fluid responsive device for energization thereof;
a detector-amplifier section having its input coupled to said fluid responsive device and its output coupled to said alarm indication mechanism;
electrical energization means carried by said tape reel mechanism including a battery and switch means for coupling said battery in circuit with the input of said amplifier section of said electronic circuitry;
said tape assembly including a tape indicia means and a pair of electrically conductive wires, said tape forming a common ground, said switch means being coupled on circuit with said electronic circuitry through said tape and one of said conductors for energization of said fluid responsive device to transmit sonic energy, said alarm indication device being coupled in circuit with said detector-amplifier section through said other of said conductors and said common ground;
said sonic energy transmitting and receiving devices including a sonic energy transmitting crystal and a sonic energy receiving crystal, said transmitting crystal being coupled in circuit with said amplifier section for energization and said receiving crystal being coupled in circuit with said detector-amplifier section for energization thereof in response to said receiving crystal receiving the transmitted sonic energy;
said receiving crystal energizing said detector-amplifier section when faces of said housing having said free space therebetween are wetted by the fluid in said storage tank whereby the sonic energy transmitted from said transmitting crystal is received by said receiving crystal without attenuation.

11. A portable hand-held ullage measuring device for the measurement of fluid in a storage tank without visual sighting while affording protection from gas fumes or other noxious substances, including:
a fluid responsive device for producing an output signal when in contact with a fluid medium;
a tape reel mechanism comprising a tape assembly having measuring indicia thereon, said tape assembly having one end coupled with said fluid responsive device and another end coupled with said tape reel mechanism;
a tape reel including a tape assembly receiving and attachment means therefor, a shaft fixed to said reel;
a slide crank slidably coupled with said shaft; and a handle connected with said slide crank for rotating said reel to wind or to unwind said tape assembly;
an alarm indication mechanism associated with said tape reel mechanism responsive to said output signal for producing an alarm indication;
and means coupled with said tape reel mechanism to control the amount of playout of said tape assembly for stopping the playout thereof when said fluid responsive device makes contact with said fluid medium including:
a reel locking mechanism coupled to said shaft, said locking mechanism including a toothed racket mechanism, said crank including an elongated slot for coupling thereof to said shaft but permitting slidable transverse movement axially of said shaft, a lug carried by said crank engageable with said toothed mechanism to lock said reel against rotation, said crank being movable to move said lug out of engagement with said ratchet, the movement of said crank being guided by said slot, said crank being effective to rotate said shaft when said lug is disengaged from said toothed mechanism and being effective to cause said lug to engage said ratchet whereby to lock said reel against rotation, thereby preventing playout of said tape assembly.

12. The ullage device as recited in claim 11, said tape assembly comprising:
 a pair of electrical conductors coupling said fluid responsive device with said alarm indication mechanism;
 a tape provided with said indicia thereon; and,
 a clear inert fluid impervious material enclosing said electrical conductors and said tape.

13. The ullage device as recited in claim 11, said one of said conductors being connected with the inputs to said transmitting and to said receiving devices and with said batteries through said power switch, whereby closing of said power switch renders said transmitting device operative to transmit a sonic signal and said receiving device operative to receive said transmitted sonic signal.

14. The ullage device as recited in claim 12, including switch means and energization means, one of said conductors being connected in circuit with said switch means and said energization means to render said fluid responsive device operative, said switch means being coupled with said tape reel mechanism and including an externally operative switch; the other of said conductors being coupled in circuit with said alarm indication device and said fluid responsive device for rendering said indication device operative to produce an audible sound in response to said fluid responsive device making contact with the fluid medium; said tape being in circuit with said conductors and forming a common ground for said device.

15. The portable ullage device as recited in claim 11, said tape reel mechanism comprising:
 a housing for supporting said tape assembly;
 a carrying handle connected with said housing for hand-carrying and holding thereof;
 a drive shaft rotatably coupled with said carrying handle;
 a hub fixed for rotation on said shaft, said hub including a plurality of compartments, a hub cover enclosing said compartments, said tape assembly being fixed to said hub for rotation therewith;
 said alarm indication mechanism including a horn alarm contained within one of said compartments;
 energization means including batteries contained in another of said compartments, a power switch operable externally of said cover including parts contained in another of said compartments,
 and a pair of electrical wires coupled with said fluid responsive device electrically connected with said batteries and said horn alarm internally of said hub; and
 a tape assembly connected internally of said hub for connecting and holding said tape assembly onto said reel, said connection including a grounding for said tape aseembly;
 said reel locking mechanism including a reel index mechanism fixed to said housing provided with a plurality of peripherally spaced stop openings formed by said toothed ratchet, said lug forming a stop pin engageable with one of said stop openings to lock said crank with said housing, said slide crank including a longitudinal slot for coupling said crank with said shaft for rotation thereof, said crank being movable transversely of said shaft but prevented from disengagement therewith from a first position in which said stop pin engages one of said stop openings to a second position in which said stop pin is disengaged from said stop openings whereby to permit rotation of said shaft; and, said tape assembly including:
 a pair of electrical conductors coupling said fluid responsive device with said alarm indication mechanism,
 a metallic tape having said measuring indicia thereon said electrical conductors being positioned on opposite sides of said tape, said tape forming a ground for said device and said electronic circuitry, and a clear plastic insulated jacket enclosing said pair of electrical conductors and said metallic tape, said insulating material being impervious to oil and adapted for the prevention of static charge build-up, said pair of electrical wires forming a composite unit with said metalic tape, but insulated therefrom.

16. The ullage device as recited in claim 15, said fluid responsive device including:
 a sonic energy transmitting device;
 a sonic energy receiving device;
 a housing enclosing said sonic energy devices in spaced relationship relative to each other to provide a free space therebetween to permit the application of different mediums between said transmitting and receiving devices for the transmission of sonic energy depending upon the medium from said transmitting device to said receiving device;
 electrical circuitry and signal detection and amplification means connected with said devices, one of said conductors being connected with said energization means for energization of said electrical circuitry and said sonic transmitting device, the other of said electrical conductors being connected with said sonic energy receiving device through said signal detection and amplification means for transmitting a signal detected from said receiving device to energize said horn alarm, when a sonic signal transmitted from said transmitting device is received by said receiving device, said receiving device receiving said signal from said transmitting device when the fluid under measurement fills said free space; and,
 said tape assembly having a length sufficient to lower said fluid responsive device into the lower portion of cargo tanker whereby to obtain a reading without visual sighting, said tape assembly including a tape having indicia markings thereon to take a reading directly to provide an ullage indication in a volumetric measurement.

17. An ullage measuring device for the measurement of fluid in a storage tank without visual sighting while affording protection from gas fumes or other noxious substances, comprising:
 a fluid responsive device for producing an output signal when in contact with a fluid medium;
 a tape reel mechanism comprising a tape assembly having measuring indicia thereon, said tape assembly having one end coupled with said fluid responsive device and another end coupled with said tape reel mechanism;

an alarm indication mechanism associated with said tape reel mechanism responsive to said output signal for producing an alarm indication;

means coupled with said tape reel mechanism to control the amount of payout of said tape assembly for stopping the payout thereof when said fluid responsive device makes contact with said fluid medium; and electronic circuitry coupled with said fluid responsive device and said alarm indication mechanism through said tape assembly, comprising an amplifier section having its output coupled to said fluid responsive device for energization thereof, a detector-amplifier section having its input coupled to said fluid responsive device and its output coupled to said alarm indication mechanism, and electrical energization means carried by said tape reel mechanism including a battery and switch means for coupling said battery in circuit with the input of said amplifier section of said electronic circuitry;

said tape assembly including a tape indicia means and a pair of electrically conductive wires, said tape forming a common ground, said switch means being coupled on circuit with said electronic circuitry through said tape and one of said conductors for energization of said fluid responsive device to transmit sonic energy, said alarm indication device being coupled in circuit with said detector-amplifier section through said other of said conductors and said common ground;

said fluid responsive device including a sonic energy transmitting crystal and a sonic energy receiving crystal, said transmitting crystal being coupled in circuit with said amplifier section for energization and said receiving crystal being coupled in circuit with said detector-amplifier section for energization thereof in response to said receiving crystal receiving the transmitted sonic energy;

said receiving crystal energizing said detector-amplifier section when the faces of a covering for said crystals are wetted by the fluid in said storage tank whereby the sonic energy transmitted from said transmitting crystal is received by said receiving crystal without attenuation.

18. A tape assembly for use in connection with the measurement of ullage of a liquid in a storage tank without visual inspection thereof, said tape assembly including one end adapted for connection to a detection device and its other end adapted for connection to a tape assembly payout device, comprising:

an outer jacket of material impervious to the liquid under measurement and electrically non-conductive;

A pair of electrically conductive elements contained within said outer jacket; and, a tape of electrically conductive material containing measuring indicia contained within said jacket and juxtaposed to said electrically conductive elements but insulated therefrom to form a composite tape formed of said pair of conductive elements and said indicia tape;

said jacket having a dimpled surface forming a lengthwise discontinuous non-uniform outer surface overlying said tape and providing for cross-sectional areas having a narrower transverse cross-section than other cross-sectional areas of said jacket, said narrower longitudinal cross-sectional areas providing for a shorter path for electrical charge to leak through said jacket to said indicia tape for dissipation to a ground on said tape assembly payout device.

19. The tape assembly as recited in claim 18, wherein said electrical conductors are positioned on the same side of said indicia tape adjacent to each other.

20. The tape assembly as recited in claim 18, wherein said electrical conductors are positioned on opposite sides of said indicia tape, said jacket being clear whereby to permit viewing of said tape.

* * * * *

UNITED STATES PATENT AND TRADEMARK OFFICE
CERTIFICATE OF CORRECTION

PATENT NO. : 4,123,753
DATED : October 31, 1978
INVENTOR(S) : William H. Gravert It is certified that error appears in the above-identified patent and that said Letters Patent are hereby corrected as shown below:

Column 7, line 32, "guager" should be --gauger--;

line 33, "standig" should be --standing--; and line 40, "cotaining" should be --containing--.

Column 13, line 59, "and" should be --and,--;

line 60, "connected" should be --connection--.

Column 16, line 14, change "A" to --a--.

Signed and Sealed this

Third Day of April 1979

[SEAL]

Attest:

RUTH C. MASON
Attesting Officer

DONALD W. BANNER
Commissioner of Patents and Trademarks